A. A. COOK.
COMBINATION STRAINER, FUNNEL, AND LID FOR CULINARY VESSELS.
APPLICATION FILED JUNE 3, 1914.
Patented Apr. 27, 1915.
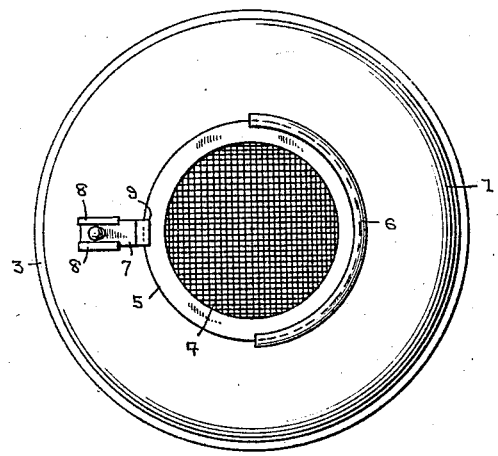
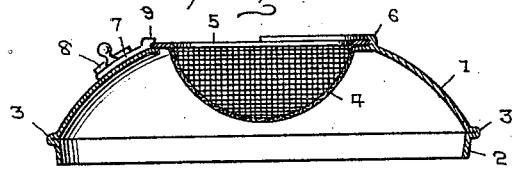
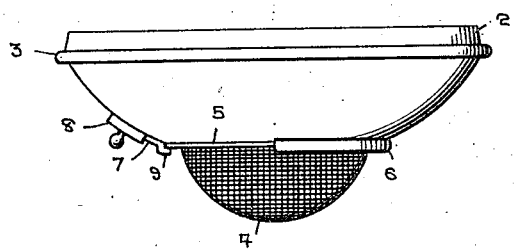
WITNESSES
A. A. Cook
INVENTOR
Attorneys

UNITED STATES PATENT OFFICE.

ALICE A. COOK, OF RICH HILL, MISSOURI.

COMBINATION STRAINER, FUNNEL, AND LID FOR CULINARY VESSELS.

1,137,190.  Specification of Letters Patent.  Patented Apr. 27, 1915.

Application filed June 3, 1914. Serial No. 842,604.

*To all whom it may concern:*

Be it known that I, ALICE A. COOK, a citizen of the United States, residing at Rich Hill, in the county of Bates and State of Missouri, have invented certain new and useful Improvements in Combination Strainers, Funnels, and Lids for Culinary Vessels; and I do hereby declare the following to be a full, clear, and exact description of the invention, such as will enable others skilled in the art to which it appertains to make and use the same.

My invention relates to combined strainers and lids for utensils and my object is to provide a convenient form of utensil lid which may be readily placed in position upon the utensil and employed as a lid and which may be easily converted into a useful form of funnel as will be hereinafter clearly set forth in the following specification, considered in connection with the accompanying drawings which are made a part of this application, and in which, Figure 1 shows a top plan view of my invention complete. Fig. 2 is a central section view thereof, showing the sieve employed as a receiving and straining orifice. Fig. 3 shows an edge view of my utensil lid as converted into a funnel.

In order to conveniently refer to the several features of my invention and coöperating parts numerals will be employed, the same numeral applying to a corresponding element in the several views.

Referring in detail to the drawings, 1 indicates a lid proper made of any preferred size and having the usual form of lip 2 designed to be received by the utensil, it being understood that the usual form of flange 3 is also provided to insure that the said lip will be properly seated within the mouth of the vessel. In the central portion of my lid, I form a suitable opening designed to serve as a seat for the reception of my improved convertible, hemispherical strainer 4 formed of mesh, wire or woven fabric or the like, said strainer portion 4 being properly trimmed upon its edges with the flange 5, positioned at a right angle to the said edge the diameter of which is slightly greater than the diameter of the opening provided in the lid for the reception of the sieve. I also provide the same with a circular lip 6 or flange permanently secured in any desired way to one-half of the edge of the opening and properly raised to receive and house the contiguous half of the flange 5 when the strainer is disposed in its operative position in the opening formed in the lid as shown more clearly in Fig. 1. In order that the strainer when thus disposed in its operative position within the opening of the lid, may be reliably secured, I provide the securing latch or keeper 7 which is operatively mounted in the guides 8, the extreme free end 9 of the said latch being bent slightly upward to normally extend over a contiguous part of the flange 5 and it is therefore obvious that such latch in connection with the lip or flange 6 will reliably hold my improved strainer when disposed in its operative position within or over the opening formed in the lid proper.

In Fig. 2, it will be seen that I have disposed the strainer section downward within the lid section which will permit the maceration of fruit and the like therein so that the juices will fall into the receptacle cover or the lid. In Fig. 3, however, I have shown the lid in inverted position and have also reversed the position of the strainer, so that it will be directed downward to form a practical continuation of the lid, thereby producing a reliable and efficient form of funnel, which will permit various liquids to be easily strained by pouring the same into the lid, which latter will direct the same downward into the strainer and thereby deliver the same to the fruit jar or the like.

My improved strainer, it is obvious, can be very quickly reversed in its position relative to the lid and reliably secured in such adjusted position through the offices performed by the flange 6 of the latch 7, as will be obvious.

Having thus fully described my invention, what I claim as new and desire to secure by Letters-Patent is:

The herein described combination strainer, funnel and lid for culinary vessels, comprising a lid having a central opening; a hemispherical strainer having a flange at right angles to the edge thereof; a circular lip attached to the under side of said lid, and a latch positioned opposite the said lip, whereby the said flange of the strainer is engaged and the strainer held in operative position.

In testimony whereof I have signed my name to this specification in the presence of two subscribing witnesses.

ALICE A. COOK.

Witnesses:
  JNO. D. MOORE,
  J. P. KLUMPP.